Aug. 25, 1959 A. ETIENNE 2,900,799
REFLUX CONDENSERS
Filed Feb. 20, 1956
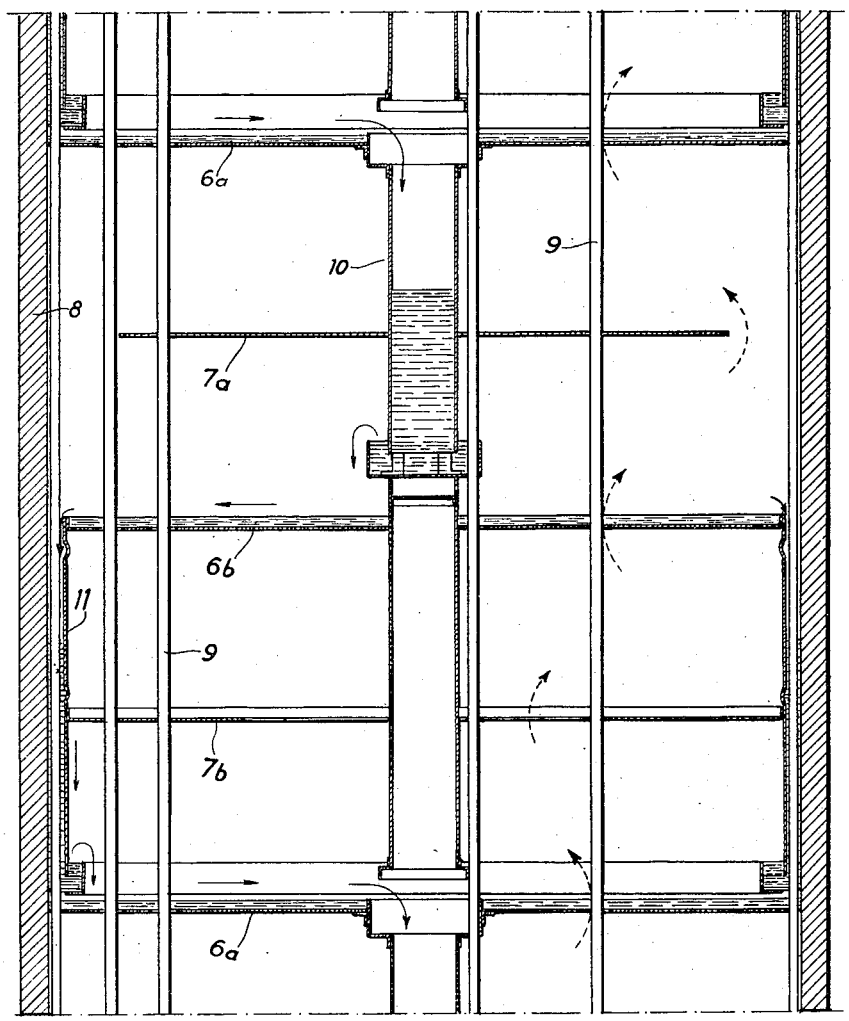
INVENTOR
ALFRED ETIENNE
By Young, Emery & Thompson
ATTYS.

United States Patent Office 2,900,799
Patented Aug. 25, 1959

2,900,799

REFLUX CONDENSERS

Alfred Etienne, Paris, France, assignor to L'Air Liquide, Societe Anonyme pour l'Etude et l'Exploitation des Procedes Georges Claude, Paris, France Application February 20, 1956, Serial No. 566,681

Claims priority, application France March 9, 1955

3 Claims. (Cl. 62—42)

The present invention has as an object to improve heat exchangers including a bundle of vertical tubes around which a gas is reflux condensed.

The invention relates most especially to reflux condensers used in plants for the separation of gaseous mixtures by low temperature liquefaction, for example in coke oven gas separation plants.

The known condensers generally include baffles imposing a sinuous path to the gas rising around the tubes, so as to increase the contact time of the gas with the condensed liquid. In spite of the presence of such baffles, there is acknowledged that in such apparatus the liquid collected in the lowest part is not so rich in heavy components as it would be if at equilibrium with the incoming gas.

The improvement which is the subject-matter of the present invention is intended to obviate such a drawback; it is characterized in that there is disposed in the exchanger at least one rectifying tray through which pass the tubes of the bundle. By using an appropriate number of trays, one can collect in the lower part of the condenser a liquid practically at equilibrium with the incoming gas, and in the upper part of the condenser a gas practically stripped from its heavy components. The enrichment by bubbling the vapour through the liquid is indeed better than that obtained by a mere counterflow contact, as in known apparatus.

Along a preferred way of application of the invention, the rectifying tray is constituted by a plate perforated with holes the diameter of which is slightly larger than the outer diameter of the tubes of the bundle. The rising gas goes up in the annular gap between the tubes and the edge of the holes. The condensed liquid may too flow through such annular gaps. It is however better to reserve them for passing the vapour and to dispose special overflow tubes for the liquid, either in the center or on the circumference.

One may too arrange between two rectifying trays one horizontal baffle of a known type.

As for unlimitative example, there is described hereinafter and represented in the annexed drawing a preferred form of embodiment of the invention, especially useful as an ethylene condenser in a coke oven gas separation plant.

The single figure is an axial cross-sectional view of an exchanger according to the invention.

The condenser includes in a cylindrical casing 8 resistant to the pressure of the treated gas, a bundle of vertical tubes 9 passing through the trays 6 and the baffles 7. The treated gas flows upwards around the tubes 9 and is partially condensed. The resulting liquid streams down on the tubes and accumulates on the trays 6. Each of the trays 6 is constituted by a simple sheet used as a perforated tray, the perforations being replaced by the gaps between the sheet and the tubes passing across it. The gap must be such that all of the rising gas can pass in the gaps between the sheet and the tubes while bubbling through the liquid of the plates, and that the liquid be hindered by the pressure of the gas to flow down through the same gaps.

On the trays 6a the circulation of the liquid is directed toward the center and the liquid goes down by the central tube 10 into which it flows. On the trays 6b the circulation is in the other direction, the liquid going from the center to the circumference, where it flows down in the gap between the casing 8 and a cylindrical jacket 11.

Each of the baffles 7a is constituted by a round sheet constraining the gas to pass between that solid sheet and the wall 8. The baffles 7b are annular and constrain the gas to pass near the central tube 10.

What I claim is:

1. A reflux condenser for the separation of gaseous mixtures by low-temperature liquefaction, comprising an outer shell, a bundle of vertical tubes within the shell through which liquid is being circulated, means for passing the gaseous mixture upwardly in contact with said tubes for reflux condensation by heat exchange with the liquid within the tubes, and rectifying means comprising rectifying trays perforated with holes through which the tubes extend; said rectifying trays being connected to the outer shell in a tight manner by a liquid seal, the diameter of each hole being slightly greater than the outer diameter of the tube thereby forming annular gaps for gaseous mixture to rise only between the tubes and the edges of the holes and bubble through a liquid condensed portion of the mixture near the gaps thereby stripping heavy components from the mixture.

2. A reflux condenser as set forth in claim 1, including baffles disposed above and below the rectifying trays.

3. A reflux condenser as set forth in claim 1, including a central overflow tube and an annular overflow jacket; some of said trays being connected with the central overflow tube to direct the condensed part of the gaseous mixture toward said central tube, while other trays are connected with the annular overflow jacket to direct the condensed part of the gaseous mixture toward said annular jacket.

References Cited in the file of this patent

UNITED STATES PATENTS

| 1,250,884 | Hubbert | Dec. 18, 1917 |
| 1,378,716 | Nielsen et al. | May 17, 1921 |
| 1,694,370 | Burdick | Dec. 11, 1928 |

FOREIGN PATENTS

| 114,817 | Great Britain | June 27, 1918 |